United States Patent
Sarratt et al.

(10) Patent No.: US 9,501,693 B2
(45) Date of Patent: Nov. 22, 2016

(54) REAL-TIME MULTICLASS DRIVER ACTION RECOGNITION USING RANDOM FORESTS

(71) Applicant: Honda Motor Co., Ltd., Tokyo (JP)

(72) Inventors: Trevor Sarratt, Santa Cruz, CA (US); Kikuo Fujimura, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 14/050,259

(22) Filed: Oct. 9, 2013

(65) Prior Publication Data

US 2015/0098609 A1 Apr. 9, 2015

(51) Int. Cl.
*G06K 9/00* (2006.01)
*G06K 9/62* (2006.01)

(52) U.S. Cl.
CPC ....... *G06K 9/00369* (2013.01); *G06K 9/00845* (2013.01); *G06K 9/6218* (2013.01); *G06K 9/6282* (2013.01)

(58) Field of Classification Search
CPC .......... G06K 9/00832; G06K 9/6282; G06K 9/00375; G06K 9/00362
See application file for complete search history.

(56) References Cited

U.S. PATENT DOCUMENTS

| | | | | |
|---|---|---|---|---|
| 5,805,747 A | * | 9/1998 | Bradford | G06K 9/6292 382/185 |
| 7,317,836 B2 | | 1/2008 | Fujimura et al. | |
| 7,590,262 B2 | | 9/2009 | Fujimura et al. | |
| 2004/0247169 A1 | * | 12/2004 | Ross | G06K 9/6229 382/137 |
| 2006/0045325 A1 | * | 3/2006 | Zavadsky | G01R 31/31704 382/145 |
| 2008/0144944 A1 | * | 6/2008 | Breed | 382/224 |
| 2009/0264161 A1 | * | 10/2009 | Usher et al. | 455/570 |
| 2010/0008547 A1 | * | 1/2010 | Yagnik | G06F 17/30781 382/118 |
| 2011/0210915 A1 | | 9/2011 | Shotton et al. | |
| 2011/0286676 A1 | * | 11/2011 | El Dokor | 382/225 |
| 2012/0036097 A1 | * | 2/2012 | Prokhorov | 706/20 |
| 2012/0225719 A1 | | 9/2012 | Nowozin et al. | |
| 2014/0125474 A1 | * | 5/2014 | Gunaratne | 340/439 |

OTHER PUBLICATIONS

S. Tulyakov, S. Jaeger, V. Govindaraju, D. Doermann, "Review of classifier combination methods", H.F. Simone Marinai (Ed.), Studies in Computational Intelligence: Machine Learning in Document Analysis and Recognition, Springer (2008), pp. 361-386.*
Fanelli, G. et al., "Real Time Head Pose Estimation with Random Regression Forests" *2011 IEEE Conference on Computer Vision and Pattern Recognition (CVPR)*, Jun. 20-25, 2011, pp. 617-624.
Yu, G. et al., "Fast Action Detection via Discriminative Random Forest Voting and Top-K Subvolume Search," *IEEE Transactions on Multimedia*, Jun. 2011, pp. 507-517, vol. 13, No. 3.
Zhu, Y. et al., "Head Pose Estimation for Driver Monitoring," *2004 IEEE Intelligent Vehicles Symposium*, Jun. 14-17, 2004, pp. 501-506, University of Parma, Italy.

* cited by examiner

*Primary Examiner* — Bhavesh Mehta
*Assistant Examiner* — Ian Lemieux
(74) *Attorney, Agent, or Firm* — Arent Fox LLP (57) ABSTRACT

An action recognition system recognizes driver actions by using a random forest model to classify images of the driver. A plurality of predictions is generated using the random forest model. Each prediction is generated by one of the plurality of decision trees and each prediction comprises a predicted driver action and a confidence score. The plurality of predictions is regrouped into a plurality of groups with each of the plurality of groups associated with one of the driver actions. The confidence scores are combined within each group to determine a combined score associated with each group. The driver action associated with the highest combined score is selected.

20 Claims, 8 Drawing Sheets

REAL-TIME MULTICLASS DRIVER ACTION RECOGNITION USING RANDOM FORESTS

BACKGROUND

Field of the Disclosure

The present disclosure relates generally to action recognition and in particular to recognizing actions of a driver in a vehicle.

Description of the Related Arts

Vehicle functions and features available to and controlled by a driver have advanced in recent years. Many vehicles feature integrated computing systems that can be used to help drivers by retrieving and relaying relevant information. However, current vehicle systems have little or no insight into the driver's activity at any given moment, and thus may fail to deliver notifications at the safest and most convenient time for a driver. For example, a driver might not notice a notification from an integrated computing system if the notification is delivered while the driver is performing an action such as adjusting the rearview mirror or reaching for the glove compartment.

SUMMARY

A non-transitory computer-readable storage medium and method performs action recognition on an image of a driver in a vehicle. A computer system receives an image of the driver in the vehicle. A random forest model is accessed, which comprises a plurality of decision trees. A plurality of predictions are generated using the random forest model. Each prediction is generated by one of the plurality of decision trees and each prediction comprises a predicted driver action and a confidence score. The plurality of predictions are grouped into a plurality of groups with each of the plurality of groups associated with one of the driver actions. The confidence scores are combined within each group to determine a combined score associated with each group. The driver action associated with the highest combined score is selected.

In another embodiment, a method learns a random forest model for action recognition, where the random forest model comprises a plurality of decision trees. A computer system receives a plurality of training images. Each training image depicts a driver action being performed inside a vehicle and has a label identifying the driver action being performed. A test corresponding to a parent node of one of the plurality of decision trees is generated, where the test comprises one or more test parameters. The test is applied to each training image to classify each training image into a plurality of image groups including at least a first image group and a second image group. The computer system determines if an entropy value of the first image group is below a threshold value. Responsive to determining that the entropy value is below the threshold value, the computer system generates a prediction based on the first image group and a leaf node associated with the prediction as a child node of the parent node is generated. The prediction comprises a driver action and a confidence score. Responsive to determining that the entropy value of the first image group is not below the threshold value, a branch node associated with the first image group is generated as a child node of the parent node.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present disclosure can be readily understood by considering the following detailed description in conjunction with the accompanying drawings.

DETAILED DESCRIPTION OF EMBODIMENTS

Embodiments are now described with reference to the accompanying figures. Like reference numbers indicate identical or functionally similar elements. Also in the figures, the left most digit of each reference number corresponds to the figure in which the reference number is first used.

Overview

An action recognition system recognizes driver actions by using a random forest model to classify three-dimensional (3D) images of the driver based on an action being performed by the driver when the 3D image is captured. Actions may include, for example, normal driving, reaching for the center compartment, reaching for the glove compartment, reaching for an overhead compartment, adjusting the radio, talking on the phone, eating, drinking, texting, reading a map, applying cosmetics, waving, reaching into the back seat, adjusting a mirror, and other common actions taken by a driver.

In a training phase, the random forest model is learned from a set of labeled training images. The random forest model includes multiple decision trees. In operation, a 3D camera captures a 3D image of the driver, the action recognition system applies each decision tree learned in the training phase to the 3D image, and each decision tree generates a separate prediction of the action captured by the 3D image. The prediction from each decision tree also includes a confidence score indicating a confidence associated with the prediction. After generating predictions for each decision tree in the random forest model, the action recognition system combines the confidence scores associated with each driver action and selects the driver action with the highest combined score.

System and Training Environment

Figure 1A:
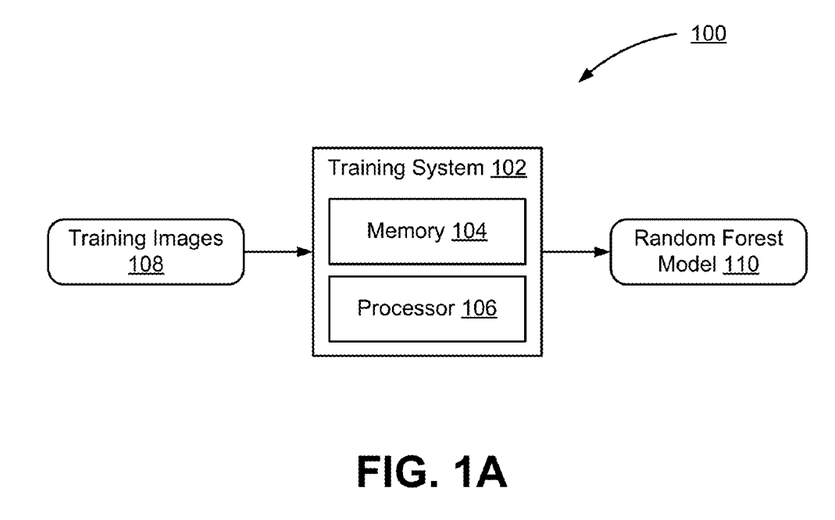
FIG. 1A illustrates an exemplary training environment, according to one embodiment.

FIG. 1A illustrates an exemplary training environment 100 for various embodiments. The exemplary training environment 100 includes a training system 102. The training system 102 receives a set of training images 108 as inputs. The training images 108 include images of a driver performing various actions in a vehicle environment that will be learned by the training system 102. The disclosed processes can also be applied to a passenger of the vehicle or other subject.

Each training image is labeled with a driver action indicating the action being performed when the image was captured. Based on the training images 108, the training system 102 generates a random forest model 110 that maps the training images to the actions.

The training system 102 includes a memory 104 and a processor 106. The memory 104 includes a non-transitory computer-readable storage medium that stores computer-executable instructions for carrying out the functions attributed to the training system 102. The memory 104 may additionally store the training images 108, the random forest model 110, or other intermediate data generated during the training process. The processor 128 processes data signals and may include various computing architectures including a complex instruction set computer (CISC) architecture, a reduced instruction set computer (RISC) architecture, or an architecture implementing a combination of instruction sets. Although only one processor is shown in FIG. 1A, multiple processors may be included. The processors can include an arithmetic logic unit, a microprocessor, a general purpose computer, or some other information appliance equipped to transmit, receive and process electronic data signals from the memory 104 and other devices both shown and not shown in the figures.

In operation, the processor 106 loads and executes the instructions stored in the memory 104 to carry out the training processes described herein. An embodiment of a process performed by the training system 102 is described in further detail below with respect to FIG. 4.

Figure 1B:
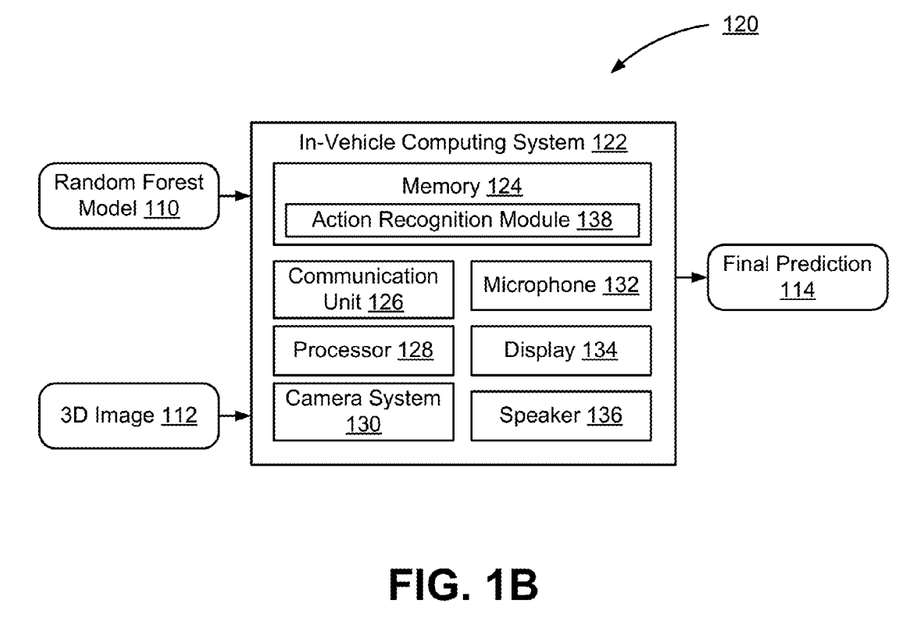
FIG. 1B illustrates an exemplary in-vehicle computing environment for various embodiments of the action recognition module, according to one embodiment.

FIG. 1B illustrates an exemplary operating environment 120 for various embodiments. The exemplary operating environment 120 includes an in-vehicle computing system 122. In one embodiment, the in-vehicle computing system 122 generates a final prediction 114 of the action of the driver based on a three-dimensional (3D) image 112 of the driver performing the action and the random forest model 110. For example, the in-vehicle computing system 122 captures an image of the driver and predicts whether the driver is texting, reaching for the glove compartment, adjust a mirror, etc.

The in-vehicle computing system 120 includes a memory 124 and a processor 128. The memory 124 includes a non-transitory computer-readable storage medium that stores computer-executable instructions for carrying out the functions attributed to the in-vehicle computing system 122. The processor 128 process data signals and may include various computing architectures including a complex instruction set computer (CISC) architecture, a reduced instruction set computer (RISC) architecture, or an architecture implementing a combination of instruction sets. Although only one processor is shown in FIG. 1B, multiple processors may be included. The processors can include an arithmetic logic unit, a microprocessor, a general purpose computer, or some other information appliance equipped to transmit, receive and process electronic data signals from the memory 124, and other devices both shown and not shown in the figures. In operation, the processor 128 loads and executes the instructions stored in the memory 124 to carry out the recognition process described herein.

The exemplary operating environment 120 also includes input devices, such as a camera system 130 and a microphone 132. In one embodiment, the camera system 130 includes a sensor that captures physical signals from within the vehicle (e.g., a time of flight camera, an infrared sensor, a traditional camera, etc). The camera system 130 is positioned within the vehicle to capture poses of a driver. The camera system 130 may be a single camera which is focused on one capture region (e.g., the driver seat), has a wide field of view, and can receive signals from more than one occupant of the vehicle, or can change its field of view to receive signals from different occupant positions. In one embodiment, the camera 130 captures 3D images that include depth data.

After capturing a physical signal, the camera system 130 outputs a data signal representing the physical signal. The format of the data signal may vary based on the type of sensor(s) that were used to capture the physical signal. For example, if a traditional camera sensor was used to capture a visual representation of the physical signal, then the data signal may be an image or a sequence of images (e.g., a video). In embodiments where a different type of sensor is used, the data signal is a more abstract or higher-level representation of the physical signal. In one embodiment, the camera system 130 includes two or more cameras, providing depth data through techniques such as triangulation and stereovision or time-of-flight.

The microphone 132 may capture audio signals from inside the vehicle. In one embodiment, the microphone 132 can be positioned so that it is more sensitive to sound emanating from a particular position (e.g., the position of the driver) than other positions (e.g., other occupants). For example, the microphone 132 may be positioned in the cabin or pointing toward the cabin and can be mounted on the ceiling, headrest, dashboard or other locations in/on the vehicle.

An action recognition module 138 represents computer instruction in memory 124, where the instructions are for inducing the random forest model 110 to determine a prediction of an action performed by the driver in the vehicle. The processor 128 accesses the computer instructions of the action recognition module 138 in memory 124 to induce the random forest model 110 with the captured 3D image and generate a prediction of the action being performed by the driver. Feedback related to the prediction may be outputted via one or more output devices, described in more detail in the following paragraph. In another embodiment, the in-vehicle computing system 122 alters other system functions using the feedback from the action recognition module 138. For example, the in-vehicle computing system 122 sends a command to delay a notification if the driver is performing an action that may cause the driver to miss the notification, or if delivery of the notification would be unsafe because the driver is already distracted (e.g., when the driver is reaching for the glove compartment).

The operating environment 120 also includes output devices, such as a display 134 and a speaker 136. The display 134 receives and displays a video signal. The display 134 may be incorporated into the vehicle (e.g., an LCD screen in the central console, a HUD on the windshield). In one embodiment, the display 134 presents a user interface that allows the user to change settings of various components in the vehicle. The speaker 136 receives and plays back an audio signal. Similar to the display 134, the speaker 136 may be incorporated into the vehicle.

In various embodiments, the in-vehicle system 122 may include different or additional components, or functions may be distributed differently between the components. Furthermore, in one embodiment, the training system 102 may be part of the in-vehicle computing system 122 and operate as an integrated system.

Figure 2:
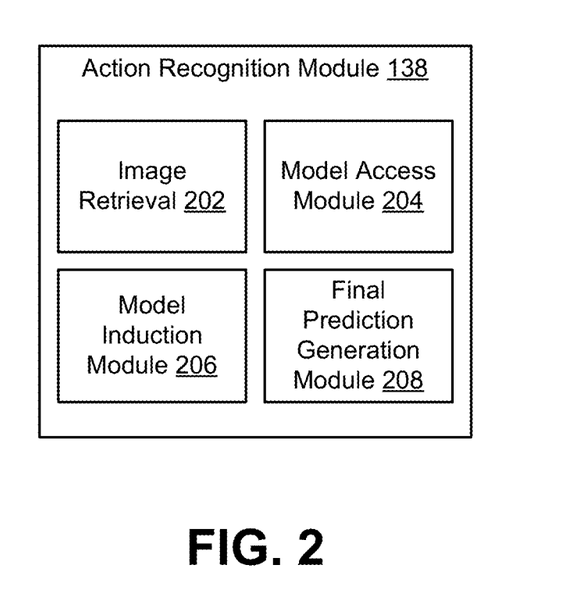
FIG. 2 is a block diagram illustrating components of the action recognition module, according to one embodiment.

FIG. 2 is a block diagram illustrating components of the action recognition module 138 of the in-vehicle computing system 122 of FIG. 1B, according to one embodiment. The action recognition module 138 includes an image retrieval module 202, a model access module 204, a model induction module 206, and a final prediction generation module 208. In alternative embodiments, the action recognition module 138 includes additional, fewer, or different components, and the functionality of the components 202, 204, 206, 208 described herein may be distributed among components of the action recognition module 138 in a different manner. A process performed by the action recognition module 138 in one embodiment is explained in further detail in the method shown in FIG. 6A.

The image retrieval module 202 accesses the data signal or the 3D image 112 feeding into the camera system 130. As described above with reference to the camera system 130, the data signal is an electronic representation of the driver performing an action in the vehicle.

The model access module 204 accesses the random forest model 110 stored by the in-vehicle computing system 122. In one embodiment, the random forest model 110 is an output of the training system 102. In other embodiments, the random forest is the output of the in-vehicle computing system 122.

The model induction module 206 applies the random forest model 110 to the 3D image 112. Each decision tree of the random forest model 110 outputs a prediction that includes a predicted driver action and a confidence score, resulting in a plurality of predictions for the 3D image.

The final prediction generation module 208 groups the plurality of predictions by driver action. For each group, the confidence scores of each prediction in the group are combined. For example, in one embodiment, each confidence score represents a weighted vote for a particular action which are summed together to generate a combined score. Note that the combined score in this embodiment does not represent a confidence for the action for the entire random forest since it may be over 100%. The final prediction generation module 208 selects the group with the highest combined score as the final prediction output of the random forest model 110. An example process would be as follows: a first group may have three predictions with the confidence scores 25%, 50% and 5% and a second group may have two predictions with the confidence scores 91% and 1%. The combined score for the first group is 80% and 92% for the second group, which represent summations of weighted votes for each action, where the confidence scores are used as weights. The final prediction 114 of the random forest model 110 will be the second group with the combined score of 92%.

Figure 3:
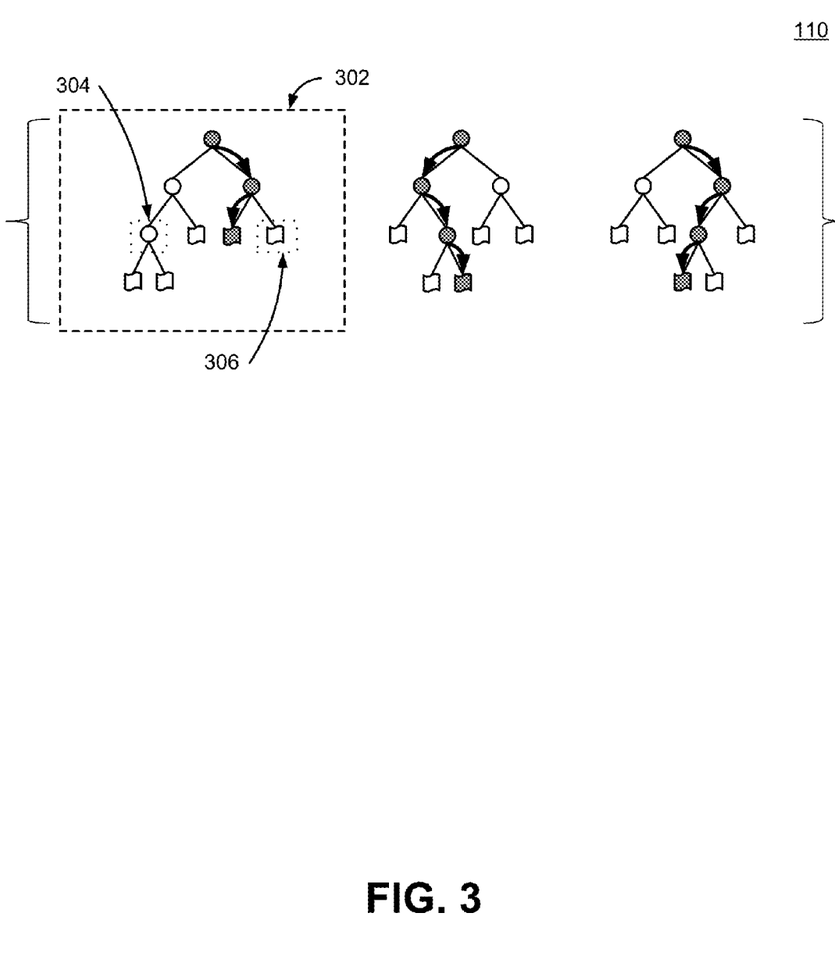
FIG. 3 illustrates a random forest tree model, according to one embodiment.

FIG. 3 is an example of an embodiment of a random forest model 110. The random forest model 110 includes one or more decision trees 302. Each decision tree 302 includes one or more branch nodes 304 and one or more leaf nodes 306. Each branch nodes 304 is associated with a test that is applied to images inputted to that node. The test classifies the image and determines whether the image is passed to left or right child node. Each branch node similarly processes the image until a leaf node 306 is reached. Predictions of the driver action 108 as well as a confidence score are associated with each leaf node 306. Thus, the decision tree generates a prediction and confidence score for each image depending on which leaf node the image reaches. The random forest model 110 includes multiple decision trees which are applied to each image. Thus, the random forest model 110 generates multiple predictions for a given image, corresponding to the leaf nodes 306 reached in each decision tree 302.

Figure 4:
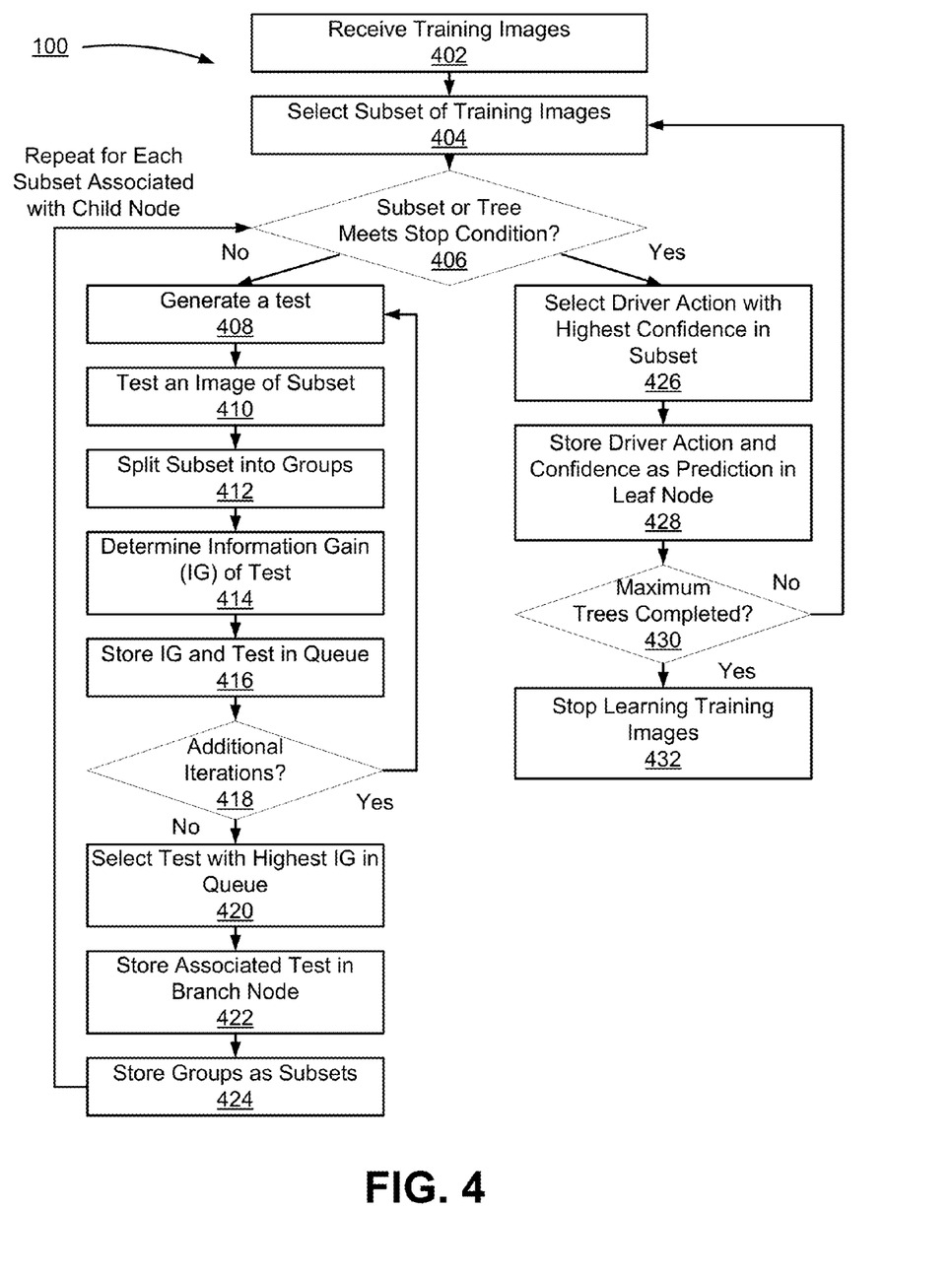
FIG. 4 is a flow chart illustrating a training process for learning a random forest model, according to one embodiment.
Figure 5A:
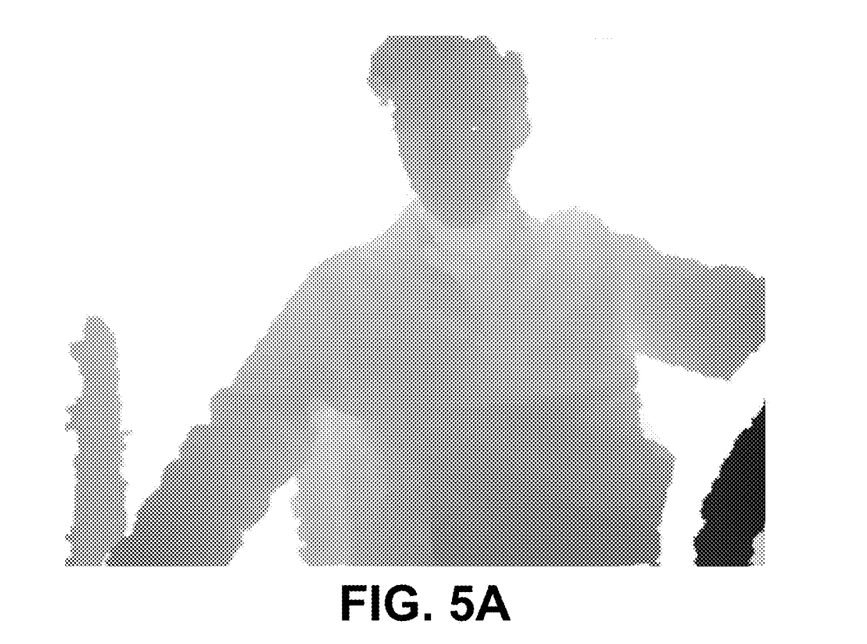
FIG. 5A illustrates a 3D image captured of a driver performing an action, according to one embodiment.

FIG. 4 is an embodiment of a process performed by the training system 102 for generating the random forest model 110 based on the training images 108. The training system 102 receives 402 training images 108. In one embodiment, the training images 108 depict a driver and are captured while the driver is performing a particular action within the video. For each action, the training images 108 may include images captured at different time points during the course of the action. Furthermore, training images 108 may include images of the actions being performed by different training subjects with differing physical appearance and motion characteristics. Each training image 108 is labeled with the action that was being performed when the image was captured. Examples of actions include, for example, normal driving, reaching for the center compartment, reaching for the glove compartment, reaching for an overhead compartment, adjusting the radio, talking on the phone, eating, drinking, texting, reading a map, applying cosmetics, waving, reaching into the back seat, adjusting a mirror, and other common actions taken by a driver within the vehicle. An example of a training image 108 is shown in FIG. 5A. In this example, depth data is represented by the intensity of the pixels (e.g., objects closer to the camera appear darker and objects further from the camera appear lighter).

The training system 102 selects 404 a subset of the training images. In one embodiment, training system 102 chooses the subset of images randomly. In another embodiment, the subset of training images is selected to ensure that it includes images corresponding to a variety of different actions and/or depict a variety of different individuals performing the action.

The training system 102 determines 406 if a stopping condition is met. In one embodiment, the stopping condition may be met when the entropy of the selected subset of training images falls below an entropy threshold value. Calculation of the entropy value is described in further detail below with reference to step 414. Additionally, the stopping condition may be met when a maximum depth of the tree is reached.

If the stop conditions are not met, the training system 102 generates 408 a test for the current node of the decision tree being trained. For example, in one embodiment, a test having the following general form is generated:

$$|F_1|^{-1} \sum_{q \in F_1} I^f(q) - |F_2|^{-1} \sum_{q \in F_2} I^f(q) > \tau,$$

where $I^f$ represents a features of a pixel q, $F_1$ represents a first region of an image, $F_2$ represents a second region of the image, and $\tau$ represents a decision threshold. The test determines whether the difference in average feature values between the first region and the second region is greater or less than the threshold value. More abstractly, the test provides an indication of whether the regions $F_1$ and $F_2$ of a particular region meet a similarity threshold.

Figure 5B:
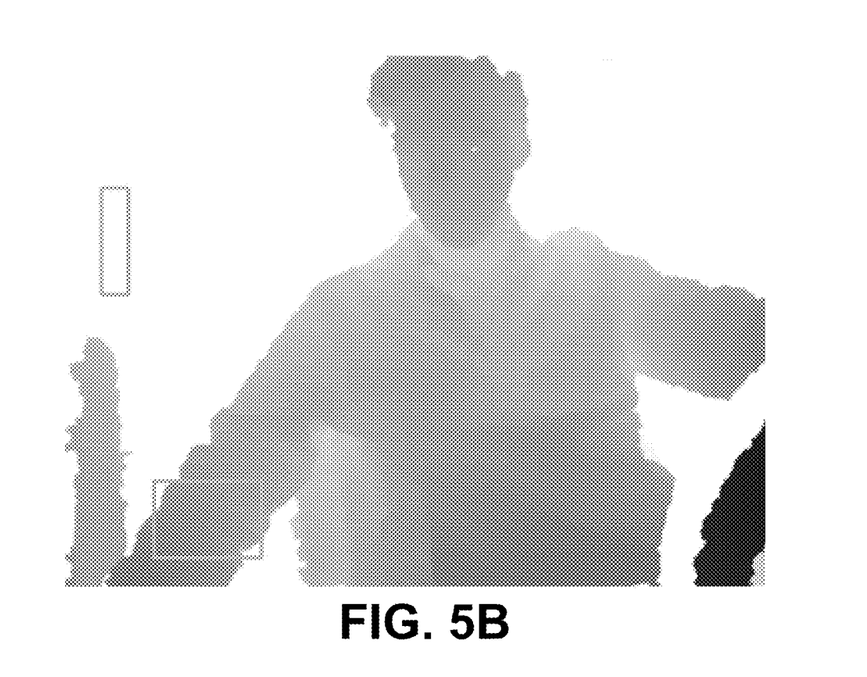
FIG. 5B illustrates two regions selected within an example 3D image according to one embodiment.

In one embodiment, generating the test includes generating values (e.g., randomly) for the parameters of the equation above. For example, in one embodiment, generating the test includes selecting the location and size of the first region $F_1$ and the location and size of the second region $F_2$, selecting the feature $F$, and selecting the threshold value $\tau$. The feature $F$ could include, for example, a depth value, an x-coordinate of a surface normal, a y-coordinate of the surface normal, or a z-coordinate of the surface normal. The first region $F_1$ and second region $F_2$ are selected, for example, by selecting the x and y range of the regions. In one embodiment, a maximum region size is enforced (e.g., 100 pixels by 100 pixels). FIG. 5B illustrates an example of two randomly selected regions for a sample image. The threshold may be selected randomly or may be selected intelligently as a function of the other parameters for a test at a particular node.

Then, the training system 102 tests 410 each image in the subset of training images 108. Based on the outcome of the test for each image, the subset is split 412 into two groups, thus creating two child nodes. For example, upon applying the test, images yielding an outcome less than the threshold are directed to the left child node, and images yielding an outcome greater than the threshold are directed to the right child node (or vice versa).

To evaluate the effectiveness of the test, an information gain (IG) of the test is determined 414. The IG quantifies how well the images were classified into the two child nodes based on entropy values. In one embodiment, the entropy H(s) of a particular subset of training images is calculated using the following equation:

$$H(T) = -\sum_{i \in labels} p(i, T)\log(p(i, T)),$$

where T is the number of images in an original subset (e.g., of parent node), i represents an action label, and p(i, s) represents a proportion of the s images that have the label i. An increase in orderliness or uniformity of the subset is indicated by a decrease in entropy. The IG is calculated using the equation $$IG = H(T) - \left[\frac{|L|H(L) + |R|H(R)}{|T|}\right],$$

where L represents the number of images from the original subset directed to the left branch based on the outcome of the test, and R represents the number of images from the original subset directed to the right branch based on the outcome of the test.

The IG and test (represented by the selected parameters) are stored 416 in a queue. In one embodiment, the queue only stores the test if it has a higher IG than previously stored tests for the current node. For example, in an iterative process, as a new test is generated, the new IG is compared with the IG stored in the queue. If the new test has a higher IG, the new test is placed in the queue and the previously stored test is removed.

The training system 102 then determines 418 if a sufficient number of iterations have been performed. The determination may be based on, for example, reaching a predetermined number of tests for the current node or finding a test that has an IG above some predetermined threshold. If the training system determines that further iterations should be performed, the process repeats to step 408 and a different test is generated for the current node (e.g., by selecting different regions, features, and or thresholds). If the training system instead determines that, additional iterations are not needed, the training system 102 select 420 the test with the highest IG. The test with the highest IG is stored 422 as the test for the current node being trained (e.g., by storing the selected parameter values).

The training system 102 then stores 424 the resulting groups of images associated with the child nodes as subsets. The process then loops to step 406 and the subsequent steps are performed separately for each of the subsets associated with the child nodes.

Returning to the stop condition step 406, if one of the stopping conditions is met in step 406, the training system 102 selects 426 the driver action with the highest confidence score in the subset. In one embodiment, the confidence is calculated based on a ratio of the number of images labeled with the predicted driver action to the total number of images in the subset for the node meeting the stopping condition, or as a percentage of the images having the predicted driver action. For example, the confidence for the driver action texting is the ratio of images in the training images at the leaf node that are labeled texting to the total number of images reaching that node. In other embodiments, the confidence relies on additional factors such as weights for different driver actions.

The training system 102 designates the node as a leaf node and stores 428 the prediction in association with the node. If the number of completed trees in the random forest is equal 430 to a maximum number of trees, then the training system 102 stops 432 learning the training images 108. In one embodiment, the maximum number of trees in the random forest is six, although other arbitrary numbers can be used depending on the desired trade-offs between speed, storage, robustness, or other factors. Otherwise, the training system 102 selects 404 another subset of the training images 108 and repeats the consequent steps.

Recognition of Driver Actions with Random Forests

Figure 6A:
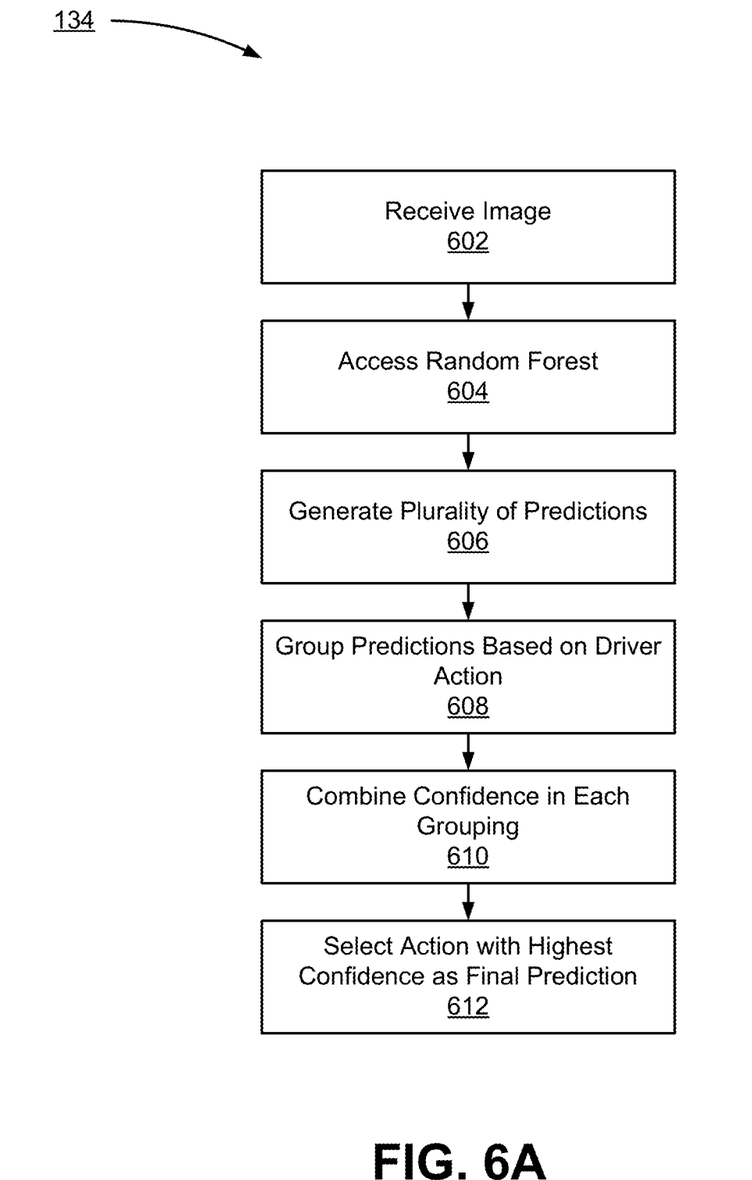
FIG. 6A illustrates a flow chart of a process for predicting an action of being performed by an individual in a captured image within a vehicle environment using a random forest model, according to one embodiment.

FIG. 6A illustrates an embodiment of a process performed by the action recognition module 138. The action recognition module 138 receives 602 a 3D image of the driver performing an action in the vehicle. The module 138 accesses 604 the random forest model 110. The in-vehicle computing system 122 induces the random forest 110 to generate 606 a plurality of predictions. In this process, the learned test is applied beginning at the top branch node of the decision tree, with the outcome of the test determining whether to move to the left or right child node of the decision tree. When a leaf node is reached, the action recognition module 138 stores the prediction and corresponding confidence value associated with that leaf node. This process is performed for each of the decisions, with each tree yielding one prediction and corresponding confidence value.

The in-vehicle computing system 122 groups 608 the predictions based on the driver actions across all decision trees. For example, all of the images predicted to have the driver action texting would be grouped together and all of the images predicted to have the driver action eating would be grouped together. Then, the confidence scores of each prediction in a given group are combined 610 into a combined score representing a summation of weighted votes, where the individual confidence scores are used as weights. For example, if three of the decision trees in the random forest model predict "texting" as the driver action with confidence scores 22%, 78%, and 50% respectively, the combined score would be 22%+78%+50%, which combines to the combined score of 150%. In alternatively embodiment, a different technique for combining the scores may be used such as, for example, computing a weighted combination, an average, a median, etc. The driver action with the highest combined score is selected 612 as the final prediction 114 for the image.

Figure 6B:
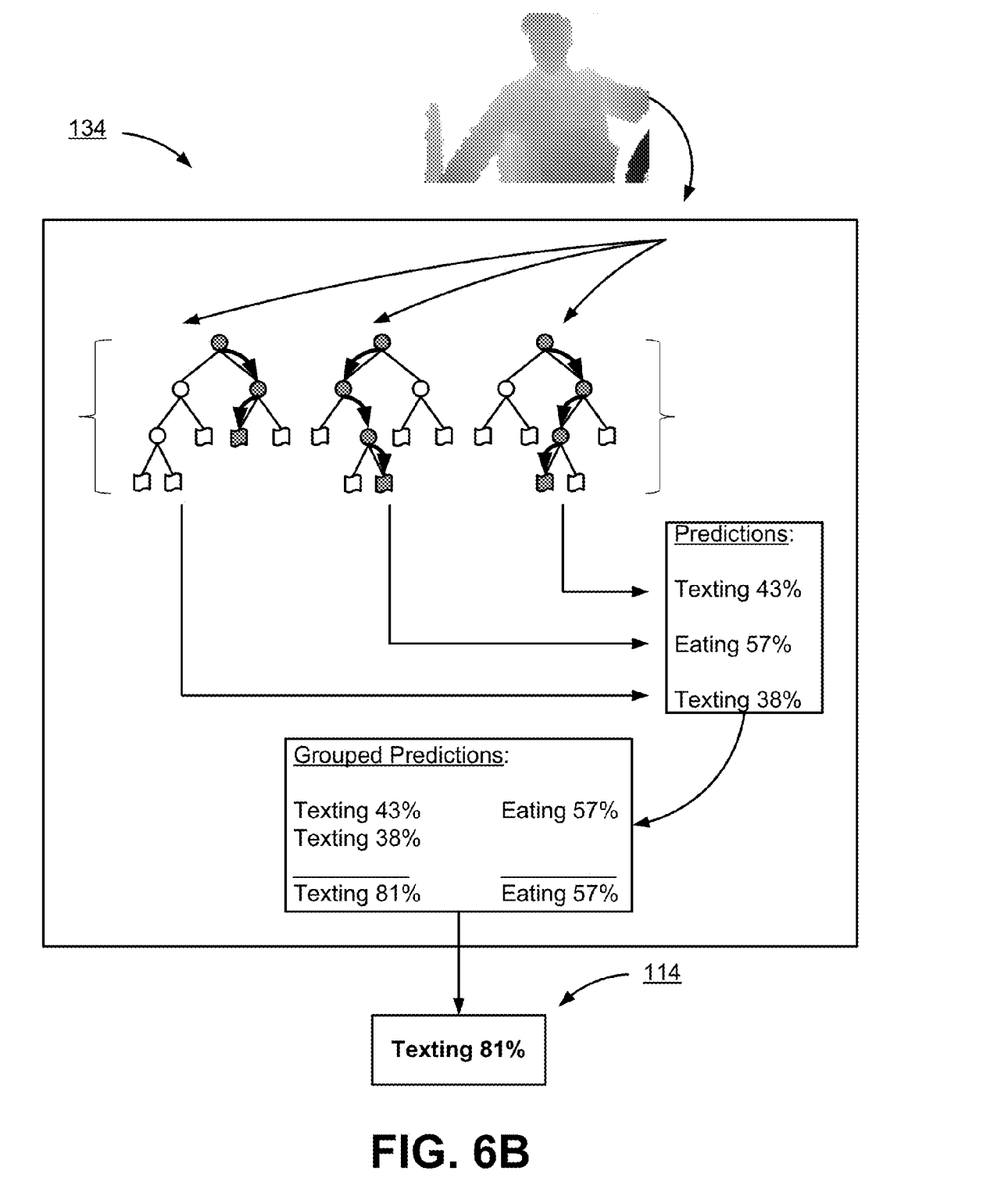
FIG. 6B illustrates an example process for predicting an action of being performed by an individual in a captured image within a vehicle environment using a random forest model, according to one embodiment.

FIG. 6B is a diagram illustrating an embodiment of a process for recognizing an action as applied to an example image. Each decision tree of the random forest is applied to the image, with each decision tree generating one prediction and a confidence value for that prediction. The predictions for the image are grouped based on the driver action. In the example of FIG. 6B, the first decision tree yields a prediction of "texting" with a 43% confidence value, the second decision tree yields a prediction of "eating" with a 57% confidence value, and the third decision tree yields a prediction of "texting" with a 38% confidence value. The predictions are then grouped by the action predicted. The confidence scores in each group are combined. For example, the confidence scores of 43% and 38% in the driver action group for "texting" are combined to yield a combined score of 81% for "texting." The driver action group for "eating" includes only one prediction in this example, with a confidence score of 57%. In this example, the "texting" prediction had the highest combined score of 81% and is selected as the final prediction 114.

Figure 7:
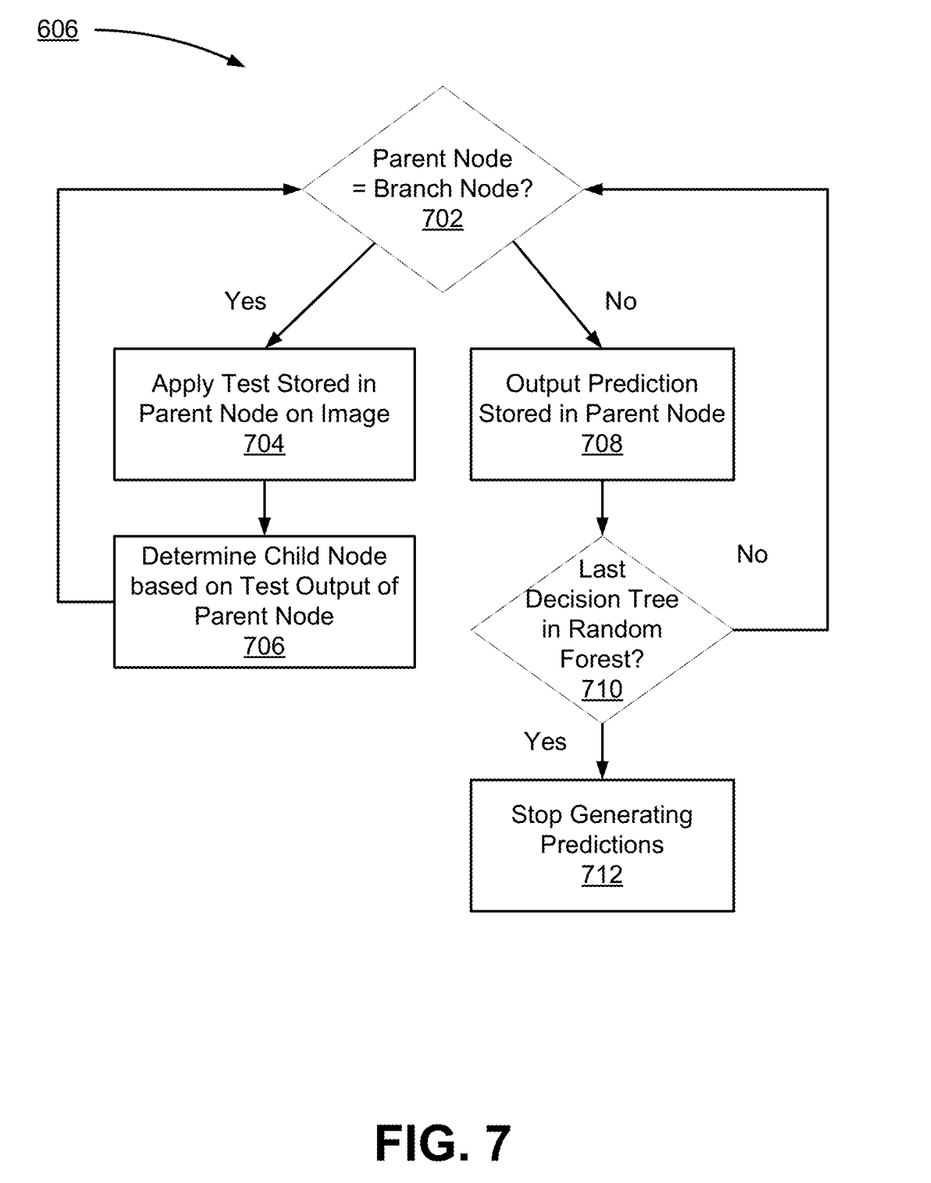
FIG. 7 is a flow chart illustrating a process for generating a plurality of predictions of an action of being performed by an individual in a captured image within a vehicle environment, according to one embodiment.

FIG. 7 illustrates an embodiment of a process for generating 606 the plurality of predictions. The in-vehicle computing system 122 determines 702 whether the current node of the currently traversed decision tree is a branch node 304 or a leaf node 306. If the current node is a branch node 304, the test associated with the current node is applied 704 to the 3D image. The in-vehicle computing system 122 determines 706 whether to branch to the left or right child node based on the output of the applied test. The process then repeats back to step 702 for the next node. If the current node is a leaf node 306 in step 702, a prediction associated with the current node is output 708 as the prediction for the decision tree. If the decision tree is the last decision tree 710 in the random forest model 110, the in-vehicle computer system 122 stops 712 generating further predictions. Otherwise, the process returns to step 702 for the next decision tree in the random forest model.

In an alternative embodiment, instead of determining each prediction on a frame-by-frame basis, predictions may be based on multiple image frames and learned state transition probabilities. In this embodiment, sequential images of a video feed are evaluated when making the predictions. Here, the learning stage discussed above includes learning state transition probabilities between actions indicating a likelihood of one action changing to another action in consecutive images of the video. Then, these state transition probabilities are used when generating predictions, for example, as weights associated with different predictions. For example, if the current image I is given an action label A, then the score associated with an action label B for image i+1 may be determined based on (i) a probability of action label (e.g., label B) of image i+1 based on image i+1 alone; and (ii) a likelihood of transition from state A to state B. In one embodiment, the weighted scores are used to determine the prediction. In another embodiment, a prediction is made only if the weighted confidence exceeds a threshold, which may be learned during training.

In a first example, if each image frame of the video feed is induced through decision trees in the random forest model 110 for a final prediction 114, a first image frame predicts a "texting" action. A second image frame immediately following the first image frame includes both "eating" (e.g., score of 80%) and "texting" (e.g., score of 55%) as predictions from different decision trees, each with different confidence scores. Using the state transition diagram of action-transition probabilities, the transition probabilities can be used as weights to determine the final prediction. For example, the state transition probability from "texting" to "eating" may be relatively low (e.g., 10%) while the "texting" to "texting" is relatively high (e.g., 75%). Due to the higher state transition probability, the system may select "texting" as the final prediction, even though "eating" had a higher score based on the second image frame alone.

Additional Considerations

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which are set forth in the claims.

Upon reading this disclosure, those of skill in the art will appreciate still additional alternative methods and systems for performing a gesture-based POI search. Thus, while particular embodiments and applications of the present disclosure have been illustrated and described, it is to be understood that the disclosure is not limited to the precise construction and components disclosed herein and that various modifications, changes and variations which will be apparent to those skilled in the art may be made in the arrangement, operation and details of the method and apparatus of the present embodiments disclosed herein without departing from the spirit and scope of the subject matter as defined in the appended claims.

What is claimed is:

1. A method for performing action recognition on an image of a driver in a vehicle, the method comprising:
   receiving, by a computing system, an image of the driver in the vehicle;
   accessing a random forest model comprising a plurality of decision trees;
   generating a plurality of predictions of the action being performed by the driver in the image through the random forest model, each prediction generated by one of the plurality of decision trees, each of the plurality of predictions comprising a predicted driver action and a confidence score comprising a ratio or percentage;
   grouping the plurality of generated predictions into a plurality of groups by the predicted driver action, such that each group of the plurality of groups is associated with a single predicted driver action;
   combining the confidence scores of the generated predictions for each group to determine a single combined score for each group relating to the predicted driver action associated with each group; and
   selecting the driver action associated with a highest combined confidence score from the plurality of groups.

2. The method of claim 1, wherein combining the confidence scores comprises adding the confidence scores.

3. The method of claim 1, wherein generating the plurality of predictions through the random forest model comprises:
   for a first decision tree in the plurality of decision trees, applying a first test to the image based on first test parameters of a parent branch node of the first decision tree in the random forest, the parent branch node having a plurality of child nodes;
   selecting one of the child nodes of the parent branch node based on a result of the test; responsive to the selected one of the child nodes being a branch node, applying a second test to the image based on second test parameters associated with the selected one of the child nodes;
   responsive to the selected one of the child nodes being a leaf node, generating the prediction, the generated prediction comprising the driver action and the confidence score associated with the leaf node.

4. The method of claim 3, wherein applying the first test based on the first test parameters comprises:
   selecting a plurality of spatial regions of the image;
   selecting a feature channel representing features of the image; and
   selecting a threshold value.

5. The method of claim 4, wherein the image comprises a three-dimensional image and wherein the selected feature channel comprises three-dimensional depth data.

6. The method of claim 4, wherein applying the first test comprises:
   determining a difference between average values of the selected feature channels of at least two of the selected plurality of spatial regions; and
   comparing the difference to the threshold value.

7. The method of claim 1, comprising:
   delaying a notification provided from an in-vehicle system based on the predicted driver action.

8. The method of claim 1, wherein the predicted driver action comprises at least one of:
   normal driving, reaching for the center compartment, reaching for a glove compartment, reaching for an overhead compartment, adjusting a radio, talking on a phone, and adjusting a mirror.

9. The method of claim 1, wherein the random forest model is learned based on a set of labeled training images.

10. A non-transitory computer-readable storage medium storing instructions for performing action recognition on an image of a driver in a vehicle, the instructions when executed by a processor causing the processor to perform steps including:
    receiving, by a computing system, an image of the driver in the vehicle;
    accessing a random forest model comprising a plurality of decision trees;

generating a plurality of predictions through the random forest model, each prediction generated by one of the plurality of decision trees, each of the plurality of predictions comprising a predicted driver action and a confidence score comprising a ratio or percentage;

grouping the plurality of generated predictions into a plurality of groups by the predicted driver action, such that each group of the plurality of groups is associated with a single predicted driver action;

combining the confidence scores of the generated predictions for each group to determine a single combined score for each group relating to the predicted driver action associated with each group; and selecting the driver action associated with a highest combined confidence score from the plurality of groups.

11. The non-transitory computer-readable storage medium of claim 10, wherein combining the confidence scores comprises adding the confidence scores.

12. The non-transitory computer-readable storage medium of claim 10, wherein generating the plurality of predictions through the random forest model comprises:

for a first decision tree in the plurality of decision trees, applying a first test to the image based on first test parameters of a parent branch node of the first decision tree in the random forest, the parent branch node having a plurality of child nodes;

selecting one of the child nodes of the parent branch node based on a result of the test;

responsive to the selected one of the child nodes being a branch node, applying a second test to the image based on second test parameters associated with the selected one of the child nodes;

responsive to the selected one of the child nodes being a leaf node, generating the prediction, the generated prediction comprising the driver action and the confidence score associated with the leaf node.

13. The non-transitory computer-readable storage medium of claim 12, wherein applying the first test based on the first test parameters comprises:

selecting a plurality of spatial regions of the image;
selecting a feature channel representing features of the image; and
selecting a threshold value.

14. The non-transitory computer-readable storage medium of claim 13,
wherein the image comprises a three-dimensional image and wherein the selected feature channel comprises three-dimensional depth data.

15. The non-transitory computer-readable storage medium of claim 13, wherein applying the first test comprises:

determining a difference between average values of the selected feature channels of at least two of the selected plurality of spatial regions; and
comparing the difference to the threshold value.

16. A method for learning a random forest model for action recognition, the random forest model comprising a plurality of decision trees, the method comprising:

receiving, by a computing system, a plurality of training images, each training image depicting a driver action being performed inside a vehicle and each training image having a label identifying the driver action being performed;

generating a test corresponding to a parent node of one of the plurality of decision trees, the test comprising one or more test parameters;

applying the test to each training image to classify each training image into a plurality of image groups including at least a first image group and a second image group; determining if an entropy value of the first image group is below a threshold value;

responsive to a determination that the entropy value of the first image group is below the threshold value, generating a prediction based on the labels associated with the first image group, the prediction comprising a driver action and a confidence score comprising a ratio or percentage, and generating a leaf node associated with the prediction as a child node of the parent node; and responsive to determining that the entropy value of the first image group is not below the threshold value, generating a branch node associated with the first image group as a child node of the parent node; wherein the generated prediction is grouped into one of a plurality of groups by the prediction, such that each group of the plurality of groups is associated with a single prediction.

17. A method as claimed in claim 16, wherein generating the test comprises:

selecting a plurality of spatial regions;
selecting a feature channel; and
selecting a threshold value.

18. The method of claim 17, wherein applying the test comprises:

for a given training image, determining an average value for the feature channel of each of the plurality of spatial regions;
determining a difference between the average values of a first spatial region and a second spatial region in the plurality of spatial regions;
comparing the difference to the threshold value to generate a comparison result; and
classifying the given training image into one of the plurality of image groups based on the comparison result.

19. The method as claimed in claim 18, wherein generating the leaf node comprises:

determining a driver action associated with a highest number of images in the first image group; and
calculating the confidence score as a percentage of the images in the first image group associated with the driver action.

20. The method of claim 16, wherein the generating the test comprises:

applying a first sample test;
determining a first information gain value for the first sample test, the information gain value representing a difference between an entropy value of the plurality of training images and a combined entropy value of the first and second image groups; applying a second sample test;
determining a second information gain value for the second sample test; and
identifying the test having a highest information gain value.

* * * * *